United States Patent [19]

Coman et al.

[11] 4,276,758
[45] Jul. 7, 1981

[54] FAIL SAFE REDUNDANT DRIVE SHAFT APPARATUS INCLUDING ELECTRICALLY OPERATIVE FAILURE DETECTION MEANS

[75] Inventors: William E. Coman, Newport; Florian E. Tepolt, Utica, both of N.Y.

[73] Assignee: The Bendix Corporation, Teterboro, N.J.

[21] Appl. No.: 79,613

[22] Filed: Sep. 27, 1979

[51] Int. Cl.³ .................. F16D 3/18; F16D 3/78
[52] U.S. Cl. ............................. 64/9 R; 64/13; 64/1 C; 192/30 W
[58] Field of Search .............. 64/13, 28 R, DIG. 1, 64/9 R, 1 C; 192/30 W

[56] References Cited

U.S. PATENT DOCUMENTS

| | | | |
|---|---|---|---|
| 2,323,489 | 7/1943 | Schmidt et al. | 192/30 W |
| 2,539,534 | 1/1951 | Eckhardt | 192/30 W |
| 2,652,914 | 9/1953 | Christenson | 64/28 R |
| 3,124,942 | 3/1964 | Rothfuss et al. | 64/13 |
| 4,133,188 | 1/1979 | Cartwright | 64/13 |
| 4,191,030 | 3/1980 | Calistrat | 64/13 |

FOREIGN PATENT DOCUMENTS 579470  11/1977  U.S.S.R. .................. 192/30 W

Primary Examiner—Ira S. Lazarus
Assistant Examiner—Magdalen Moy
Attorney, Agent, or Firm—Anthony F. Cuoco; William F. Thornton

[57] ABSTRACT

Drive shaft apparatus includes driving and driven members and primary torque transmitting means coupling the members. Redundant torque transmitting means is rendered operative for coupling said members in the event of a failure of the primary coupling means and a failure detector including electrical circuitry arranged with the redundant coupling means detects the operation thereof and provides a corresponding indication.

6 Claims, 4 Drawing Figures

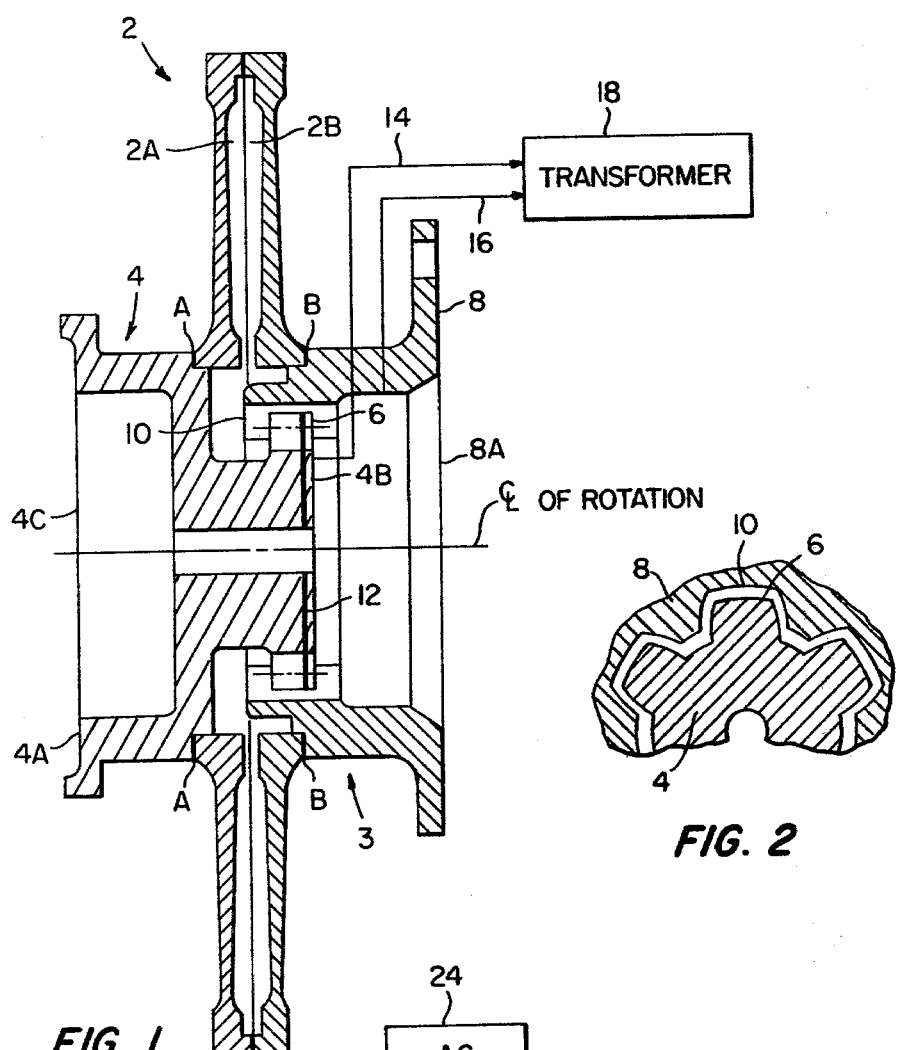
FIG. 1
FIG. 2
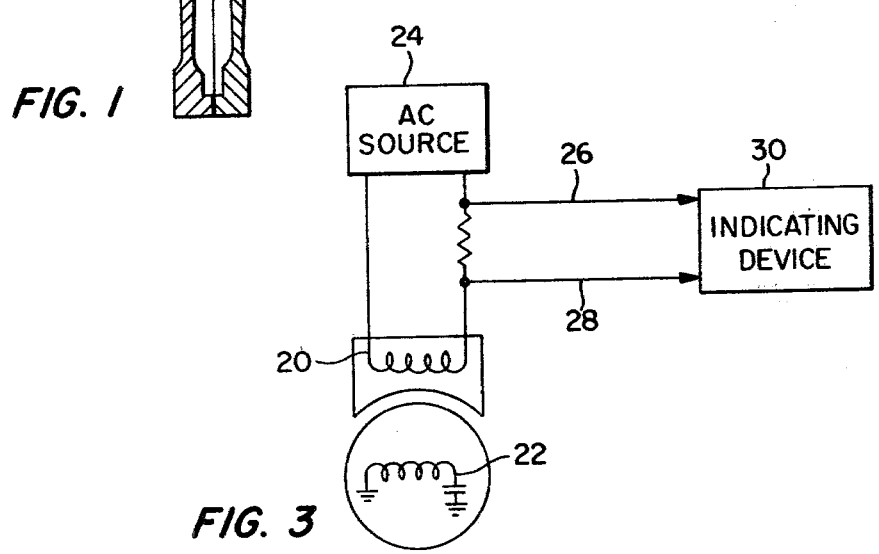
FIG. 3

FAIL SAFE REDUNDANT DRIVE SHAFT APPARATUS INCLUDING ELECTRICALLY OPERATIVE FAILURE DETECTION MEANS

FIELD OF THE INVENTION

This invention relates generally to drive shaft apparatus and particularly to drive shaft apparatus having redundant torque transmitting means. More particularly, this invention relates to drive shaft apparatus including means for detecting and indicating failure of primary torque transmitting means, whereupon the redundant torque transmitting means is rendered operative.

DESCRIPTION OF THE PRIOR ART

Drive shaft apparatus of the type having driving and driven members coupled by a flexible diaphragm arrangement for correcting misalignment between the members is well known in the art. A flexible coupling of the type referred to is disclosed and claimed in commonly assigned U.S. Pat. No. 3,124,942, issued on Mar. 17, 1964, to Neal B. Rothfus and Henry Troeger.

In critical applications such as for aircraft drives or the like, it is important that a redundant coupling be provided in the event of a malfunction or failure of the primary coupling, i.e., the flexible coupling. Further, since the redundant coupling is usually designed for only a limited life, a fail-safe indication of the primary coupling failure is required. Prior to the present invention there has not been drive shaft apparatus incorporating these features.

SUMMARY OF THE INVENTION

This invention contemplates drive shaft apparatus having driving and driven members and primary torque transmitting means coupling the members. A redundant coupling is rendered operative in the event of a failure of the primary coupling. The redundant coupling includes spline means having a transformer circuit connected thereto. The redundant coupling is inoperative as long as the primary coupling is functional. Upon a failure or malfunction of the primary coupling, the spline means is rendered operative to transmit torque for a limited period. The transformer circuit is thereupon affected to detect and indicate the failure. In one embodiment of the invention the transformer includes a stationary and a rotating winding, and the indication is provided when a failure short circuits the rotating winding to reduce the impedance in the primary winding, whereby a failure indicator is energized. Another embodiment of the invention features two separate stationary windings arranged with two separate rotating windings. The indication is provided when a failure short circuits a rotating winding to cause the absence of a signal at a stationary winding, whereby the failure indicator is energized.

DESCRIPTION OF THE DRAWINGS

FIG. 1 is a diagrammatic sectioned view showing drive shaft apparatus including a primary coupling and a redundant coupling according to the invention.

FIG. 2 is a diagrammatic sectioned view showing the structural relationship between spline members included in the redundant coupling shown in FIG. 1 when the redundant coupling is inoperative.

FIG. 3 is a block diagram-electrical schematic showing an embodiment of circuit means arranged with the drive shaft apparatus shown in FIG. 1 for detecting failure of the primary coupling, whereupon the redundant coupling is rendered operative.

DESCRIPTION OF THE INVENTION

Figure 4:
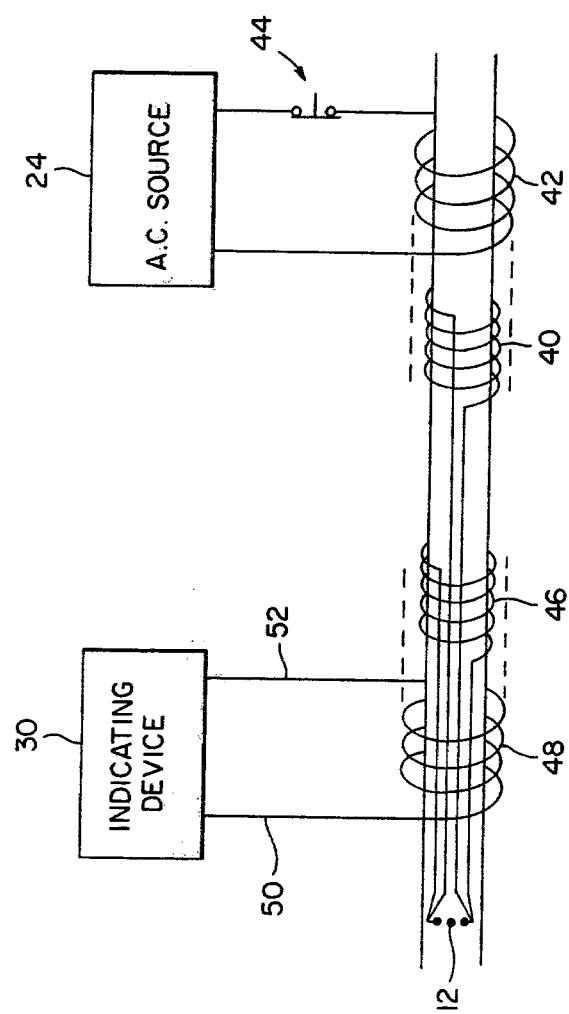
FIG. 4 is a block diagram-electrical schematic showing another embodiment of circuit means for detecting failure of the primary coupling.

With reference first to FIG. 1, a flexible torque transmitting coupling is designated generally by the numeral 2 and a spline coupling is designated generally by the numeral 3. Spline coupling 3 includes a spline adapter 4 having an external spline 6 arranged with a spline flange 8 having an internal spline 10. Spline adapter 4 and spline flange 8 are secured to opposite sides of flexible coupling 2 as by welding or the like at points A and B in the Figure.

In this connection, reference is made to FIG. 2 wherein external spline 6 and internal spline 10 are arranged during the aforenoted welding so that there is clearance therebetween. This is accomplished by placing shims of equal thickness between the opposite sides of an external spline tooth and the corresponding sides of a mating internal spline tooth and removing the shims after the welding has been completed. The spline teeth do not engage until the spline coupling becomes operative as will be hereinafter explained.

The structure of spline adapter 4 is of importance to the invention. Hence, the spline adapter is formed as two separate members as shown in FIG. 1. One of the members, designated as 4A, is the primary load carrying member, while the other member, designated as 4B, is a thin section fastened to member 4A by screws or rivets or the like (not shown) and insulated therefrom by a suitable insulating member 12.

Except for insulating member 12, spline adapter 4 would close an electrical circuit through flexible coupling 2 and spline flange 8. With the arrangement shown, the circuit is closed only upon a failure of flexible coupling 2, whereupon splines 6 and 10 engage to render the spline coupling operative.

Spline adapter 4 is coupled at end 4C thereof by suitable means such as welding or the like to a drive shaft (not shown). Spline flange 8 is coupled at end 8A thereof by like means to another shaft (not shown) which can be the driven shaft relative to the drive shaft, or the arrangement obviously can be reversed. In any event, during the transmission of torque the shafts are in a slight degree of misalignment relative to each other.

Flexible coupling 2, as described in the aforenoted U.S. Pat. No. 3,124,942, includes flexible diaphragm elements 2A and 2B forming a flexible torque transmitting coupling for the driving and driven shafts to compensate for the aforenoted misalignment.

The construction and operation of the flexible coupling will not be described in further detail herein, except to say that the flexible coupling provides primary torque transmitting means between the driving and driven shafts. As long as coupling 2 is operative, spline coupling 3, which is in effect a redundant torque transmitting means or coupling, is inoperative.

Upon the failure of flexible coupling 2, i.e., its inability to transmit torque from the driving to the driven shafts, redundant torque transmitting coupling 3 is rendered operative. To this end, spline adapter 4 rotates relative to spline flange 8 (a few degrees) until the external and internal splines engage to accomplish the torque transmitting function. Under these conditions, portion 4B of spline adapter 4 completes an electrical circuit through spline flange 8. This feature is utilized to detect and indicate the failure of flexible coupling 2 as will next be described.

As shown in FIG. 1, a conductor 14 is connected to rotating spline adapter member 4B, while a conductor 16 is connected to stationary spline flange 8. Conductors 14 and 16 provide an electrical connection to a transformer designated generally by the numeral 18. Transformer 18 is an air core transformer and will be further described with reference to FIGS. 3 and 4.

With reference first to FIG. 3, a primary or stationary winding 20 is excited by a suitable AC source 24 which induces a voltage in a secondary winding 22 which is arranged to rotate with the drive shaft.

Upon external spline 6 and internal spline 10 making contact through the rotation of spline adapter 4, the electrical circuit thereby closed is effective for short circuiting secondary winding 22. This causes a sharp reduction in the impedance of primary winding 20 which is sensed at output conductors 26 and 28 and energizes an indicating device 30 for indicating a failure of flexible coupling 2 and the ensuing operation of redundant coupling 3. Indicating device 30 may be located in an aircraft cockpit or the like to provide a visual or audible indication or alarm, as the case may be.

It will be understood that the described failure detection and indication is essential since the redundant spline coupling is usually designed to only temporarily carry the load being transmitted. It is imperative, therefore, that in aircraft applications, for example, the pilot receives immediate warning that the primary coupling has failed so that appropriate action may be taken.

Another more reliable embodiment of the failure detection and indication feature of the invention is illustrated in FIG. 4. This embodiment, as does the embodiment shown in FIG. 3, features a secondary winding designated by the numeral 40 which is arranged to rotate with the drive shaft and a stationary primary winding designated by the numeral 42. Stationary primary winding 42 is connected to AC source 24 through a "push-to-test" switch 44. A primary winding 46 is arranged to rotate with the shaft and a secondary winding 48 is arranged to be stationary. Windings 40 and 46 are in a parallel arrangement and the physical junction of the windings is located as close as possible to insulating member 12 so that any break in the connecting conductors will trigger a failure indication.

Primary winding 42 is energized by AC source 24 and a voltage is induced in secondary winding 40 as described with reference to the embodiment of the invention shown in FIG. 3. This voltage energizes primary winding 46 due to the parallel arrangement of the windings. This, in turn, induces a signal in secondary winding 48 which is sensed at output conductors 50 and 52.

In the event of a failure of primary coupling 2, whereby redundant coupling 3 is rendered operative as heretofore described, rotating windings 40 and 46 are short-circuited and hence no signal is provided at output conductors 50 and 52.

The absence of a signal at the output conductors causes failure indicator 30 to be energized. In this manner a failure in the primary coupling or a failure in AC source 26, the transformer windings or the interconnecting windings, triggers a failure indication. Push-to-test switch 44 is used to momentarily interrupt the connection between signal source 24 and fixed primary winding 42 to check the operation of the entire failure detection and indication system.

There has heretofore been described drive shaft apparatus including fail-safe failure detection means. In the event the primary torque transmitting means or coupling fails, a redundant coupling is rendered operative. Since the redundant coupling has a limited life, a fault detection and indicating system is provided for detecting and indicating when the primary coupling has failed so that appropriate action may be taken.

What is claimed is:

1. Drive shaft apparatus, comprising:

a drive shaft having driving and driven members;

primary torque transmitting means coupling the driving and driven members;

redundant torque transmitting means coupled to the primary torque transmitting means and rendered operative upon a failure of the primary torque transmitting means for coupling the driving and driven members, the redundant torque transmitting means including a first spline member coupled to the primary torque transmitting means and coupled to one of the driving and driven shafts, a second spline member coupled to the primary torque transmitting means and coupled to the other of the driving and driven shafts, the first and second spline members being in mating relation, with the respective splines thereof being disengaged so that the redundant torque transmitting means is inoperative when the primary torque transmitting means is operative, and one of the first and second spline members being displaced upon a failure of the primary torque transmitting means, whereupon said means is rendered inoperative so that the respective splines of the first and second spline members are engaged and the redundant torque transmitting means is rendered operative;

the one spline member having a first main torque transmitting section and a second relatively thin section secured to the first section, and an insulating member separating the first and second sections so that an open electrical circuit through the one and the other of the first and second spline members and the primary torque transmitting means is provided when the redundant torque transmitting means is inoperative, with said circuit being closed through the engagement of the respective splines of the first and second spline members when the redundant torque transmitting means is operative;

a transformer circuit arranged with the redundant torque transmitting means and including a stationary winding, means for exciting the stationary winding and a winding inductively coupled to the stationary winding and rotating with the drive shaft;

the operative redundant torques transmitting means affecting the transformer circuit for short circuiting the rotating winding; and means connected to the transformer circuit for sensing the short circuit which is indicative of a failure of the primary torque transmitting means.

2. Drive shaft apparatus as described by claim 1, wherein:

the closing of the circuit through the engagement of the respective splines of the first and second spline members short circuits the rotating winding which reduces the impedance of the stationary winding; and the means for sensing the short circuit which is indicative of a failure of the primary torque transmitting means senses the reduced impedance of the stationary winding.

3. Drive shaft apparatus as described by claim 1, wherein:
   the stationary winding includes first and second portions;
   the rotating winding includes a first portion inductively coupled to the first portion of the stationary winding and a second portion inductively coupled to the second portion of the stationary winding;
   the first and second portions of the rotating winding are connected in a parallel arrangement;
   the first portion of the stationary winding is energized by the energizing means, whereupon a signal is induced in the first portion of the rotating winding;
   the second portion of the rotating winding is energized by the signal induced in the first portion of the rotating winding, whereupon a signal is induced in the second portion of the stationary winding;
   the closing of the circuit through the engagement of the respective splines of the first and second spline members short circuits the first and second portions of the rotating winding which results in the absence of the signal induced in the second portion of the stationary winding; and
   the means for sensing the short circuit which is indicative of a failure of the primary torque transmitting means senses the absence of said signal.

4. Drive shaft apparatus as described by claim 3, including:
   switching means connecting the energizing means to the first portion of the stationary winding and manually operable to disconnect the energizing means and said winding for testing the transformer circuit.

5. Drive shaft apparatus as described by claim 2, wherein the means connected to the transformer circuit for sensing the short circuiting includes:
   indicating means connected intermediate the stationary winding and the exciting means and responsive to the reduced impedance of the stationary winding for providing a failure indication.

6. Drive shaft apparatus as described by claim 3, wherein the means connected to the transformer circuit for sensing the short circuiting includes:
   indicating means connected to the second portion of the stationary winding for sensing the absence of said signal to provide a failure indication.

* * * * *